United States Patent
Pisacreta et al.

(10) Patent No.: US 10,072,520 B2
(45) Date of Patent: Sep. 11, 2018

(54) ACOUSTIC TREATMENT TO MITIGATE FAN NOISE

(71) Applicant: United Technologies Corporation, Hartford, CT (US)

(72) Inventors: Pellegrino J. Pisacreta, Newtown, CT (US); Christopher D. Ramsey, Glastonbury, CT (US); Mark W. Colebrook, Glastonbury, CT (US)

(73) Assignee: United Technologies Corporation, Farmington, CT (US)

( * ) Notice: Subject to any disclaimer, the term of this patent is extended or adjusted under 35 U.S.C. 154(b) by 82 days.

(21) Appl. No.: 14/760,746

(22) PCT Filed: Feb. 12, 2014

(86) PCT No.: PCT/US2014/015941
§ 371 (c)(1),
(2) Date: Jul. 14, 2015

(87) PCT Pub. No.: WO2014/126961
PCT Pub. Date: Aug. 21, 2014

(65) Prior Publication Data
US 2015/0361827 A1   Dec. 17, 2015

Related U.S. Application Data

(60) Provisional application No. 61/765,877, filed on Feb. 18, 2013.

(51) Int. Cl.
*F01D 25/14* (2006.01)
*F02C 7/12* (2006.01)
(Continued)

(52) U.S. Cl.
CPC .............. *F01D 25/14* (2013.01); *F01D 11/24* (2013.01); *F02C 7/12* (2013.01); *F02C 7/16* (2013.01);
(Continued)

(58) Field of Classification Search
CPC .......... F01D 25/14; F01D 11/24; F01D 5/081; F01D 5/082; F01D 5/084; F01D 5/085;
(Continued)

(56) References Cited

U.S. PATENT DOCUMENTS 4,596,116 A   6/1986  Mandet et al.
4,805,398 A * 2/1989  Jourdain ................. F01D 5/082
                                                     236/93 R
(Continued)

FOREIGN PATENT DOCUMENTS

EP   1798381 A2   6/2007
FR   2540939 A1   8/1984

OTHER PUBLICATIONS

Supplementary European Search Report for European Application No. 14751921.9 dated Jul. 22, 2016.
(Continued)

*Primary Examiner* — Steven Sutherland
(74) *Attorney, Agent, or Firm* — Carlson, Gaskey & Olds, P.C.

(57) ABSTRACT

A cooling manifold has a plurality of pieces. The pieces extend in a circumferential direction to abutting flanges. The flanges are secured together at circumferential ends of each piece. Cooling channels are formed in between inner and outer walls. Air inlets are formed in the pieces with the air inlets delivering air in the interior. There are fingers on an outer periphery. The fingers are aligned within an air outlet. The air can be delivered into the inlet, cool the interior, and leave through the outlet extending to a main conduit. The main conduit is secured directly to an outer periphery of the cooling manifold.

14 Claims, 6 Drawing Sheets

(51) Int. Cl.
  *F02C 7/18* (2006.01)
  *F02C 7/16* (2006.01)
  *F01D 11/24* (2006.01)

(52) U.S. Cl.
  CPC .......... *F02C 7/18* (2013.01); *F05D 2250/182* (2013.01); *F05D 2250/184* (2013.01)

(58) Field of Classification Search
  CPC .. F01D 5/087; F01D 5/088; F02C 7/12; F02C 7/16; F02C 7/18
  USPC .................................................. 60/782, 806
  See application file for complete search history.

(56) References Cited

U.S. PATENT DOCUMENTS

| | | |
|---|---|---|
| 5,100,291 A | 3/1992 | Glover |
| 5,116,199 A | 5/1992 | Ciokajlo |
| 5,167,488 A | 12/1992 | Ciokajlo et al. |
| 5,399,066 A | 3/1995 | Ritchie et al. |
| 5,906,473 A | 5/1999 | Sexton et al. |
| 7,972,107 B2 | 7/2011 | Dervaux et al. |
| 7,980,054 B2 | 7/2011 | Suciu et al. |
| 8,079,804 B2 | 12/2011 | Shteyman et al. |
| 8,162,593 B2 | 4/2012 | Guimbard |
| 2002/0071762 A1 | 6/2002 | Schroder |
| 2007/0140839 A1* | 6/2007 | Bucaro .................... F01D 11/24 415/178 |
| 2008/0112797 A1* | 5/2008 | Seitzer .................... F01D 11/24 415/116 |
| 2009/0208321 A1 | 8/2009 | O'Leary |
| 2010/0034635 A1 | 2/2010 | Erickson et al. |
| 2010/0232947 A1 | 9/2010 | Ireland et al. |
| 2010/0266393 A1 | 10/2010 | Saroi |

OTHER PUBLICATIONS

International Preliminary Report on Patentability for International Application No. PCT/US2014/015941 dated Aug. 27, 2015.
The International Search Report and Written Opinion for PCT Application No. PCT/US2014/015941, dated May 9, 2014.

* cited by examiner

ACOUSTIC TREATMENT TO MITIGATE FAN NOISE

CROSS-REFERENCE TO RELATED APPLICATION

This application claims priority to U.S. Provisional Application 61/765,877, filed Feb. 18, 2013.

BACKGROUND OF THE INVENTION

This application relates to a turbine case cooling recovery duct for use in a gas turbine engine.

Gas turbine engines are known, and typically include a fan delivering air into a compressor. Compressed air is passed downstream into a combustor where it is mixed with fuel and ignited. Products of this combustion pass downstream over turbine rotors, driving them to rotate.

A turbine case enclosing turbine rotors may become extremely hot, and thus cooling air is provided to cool the turbine case. The cooling air is then recovered after having cooled the turbine case, and redirected to a distinct location.

In the prior art, a recovery duct has been connected by a plurality of fingers which extend radially outwardly from an outer periphery of the turbine case to a main duct which leads to an outlet tube.

The prior art structure had a large number of pieces, and also required complex installation and maintenance procedures.

SUMMARY OF THE INVENTION

In a featured embodiment, a turbine cooling manifold has a plurality of pieces, with each piece extending in a circumferential direction to abutting flanges. The abutting flanges are secured together at circumferential ends of each of the plurality of pieces. Cooling channels are formed between a radially inner wall and an outer wall of the cooling manifold. Air inlets are formed in at least a plurality of pieces, with air inlets delivering air into the cooling channels. Fingers on the outer wall of the cooling manifold are aligned within an air outlet, such that air can be delivered into the inlet, cool an interior of the cooling manifold in cooling channels, and leave through the outlet into the fingers, and then extend to a main conduit. The main is being secured to the outer wall of the cooling manifold.

In another embodiment according to the previous embodiment, one of the plurality of pieces has an outlet connector which is connected to an outlet s-tube.

In another embodiment according to any of the previous embodiments, the piece that receives the outlet connector has main conduit portions extending in both circumferential directions, and has mating flanges at each of two opposed circumferential ends attached to others of the plurality of pieces.

In another embodiment according to any of the previous embodiments, the inlets include forward air inlets positioned at an axially forward end, which is actually forward of an axially forward most end of the fingers, and which deliver air into a forward portion of the interior of the cooling manifold.

In another embodiment according to any of the previous embodiments, there are rear air inlets circumferentially intermediate the fingers, which deliver cooling air into a rear portion of the interior of the cooling manifold. Air entering both the forward and rear inlets cooling the interior of the cooling manifold, and then communicate with the air outlet and into the finger.

In another embodiment according to any of the previous embodiments, the fingers have a radially outermost end which allows access to a bolt hole on a plate positioned radially outwardly of the main conduit.

In another embodiment according to any of the previous embodiments, the outer wall of the cooling manifold forms a portion of the main conduit and fingers.

In another featured embodiment, a gas turbine engine has a compressor, a combustor and a turbine section. The turbine section has turbine rotors, and a turbine casing. A cooling manifold cools the turbine casing having a plurality of pieces. Each of the pieces extends in a circumferential direction to abutting flanges. The abutting flanges are secured together at circumferential ends of each of the plurality of pieces. Cooling channels is formed between a radially inner wall and an outer wall of the cooling manifold. Air inlets are formed in at least one of the plurality of pieces. Air inlets deliver air into the cooling channels. Fingers on the outer wall of the cooling manifold are aligned within an air outlet, such that air can be delivered into the inlet, cool an interior of the cooling manifold in the cooling channels, and leave through the outlet into the fingers, and then extend to a main conduit. The main conduit is secured to the outer wall of the cooling manifold.

In another embodiment according to any of the previous embodiments, one of the plurality of pieces has an outlet connector which is connected to an outlet s-tube.

In another embodiment according to any of the previous embodiments, the piece which receives the outlet connector has main conduit portions extending in both circumferential directions, and has mating flanges at each of two opposed circumferential ends attached to others of the plurality of pieces.

In another embodiment according to any of the previous embodiments, the inlets include forward air inlets positioned at an axially forward end, which is actually forward of an axially forward most end of the fingers, and which deliver air into a forward portion of the interior of the cooling manifold.

In another embodiment according to any of the previous embodiments, there are rear air inlets circumferentially intermediate the fingers delivering cooling air into a rear portion of the interior of the cooling manifold. Air enters both the forward and rear inlets cooling the interior of the cooling manifold, and then communicating with the air outlet and into the finger.

In another embodiment according to any of the previous embodiments, the fingers have a radially outermost end which allows access to a bolt hole on a plate positioned radially outwardly of the main conduit.

In another embodiment according to any of the previous embodiments, the outer wall of the cooling manifold forms a portion of the main conduit and fingers.

These and other features of this application may be best understood from the following specification drawings, the following which is a brief description.

DETAILED DESCRIPTION

Figure 1:
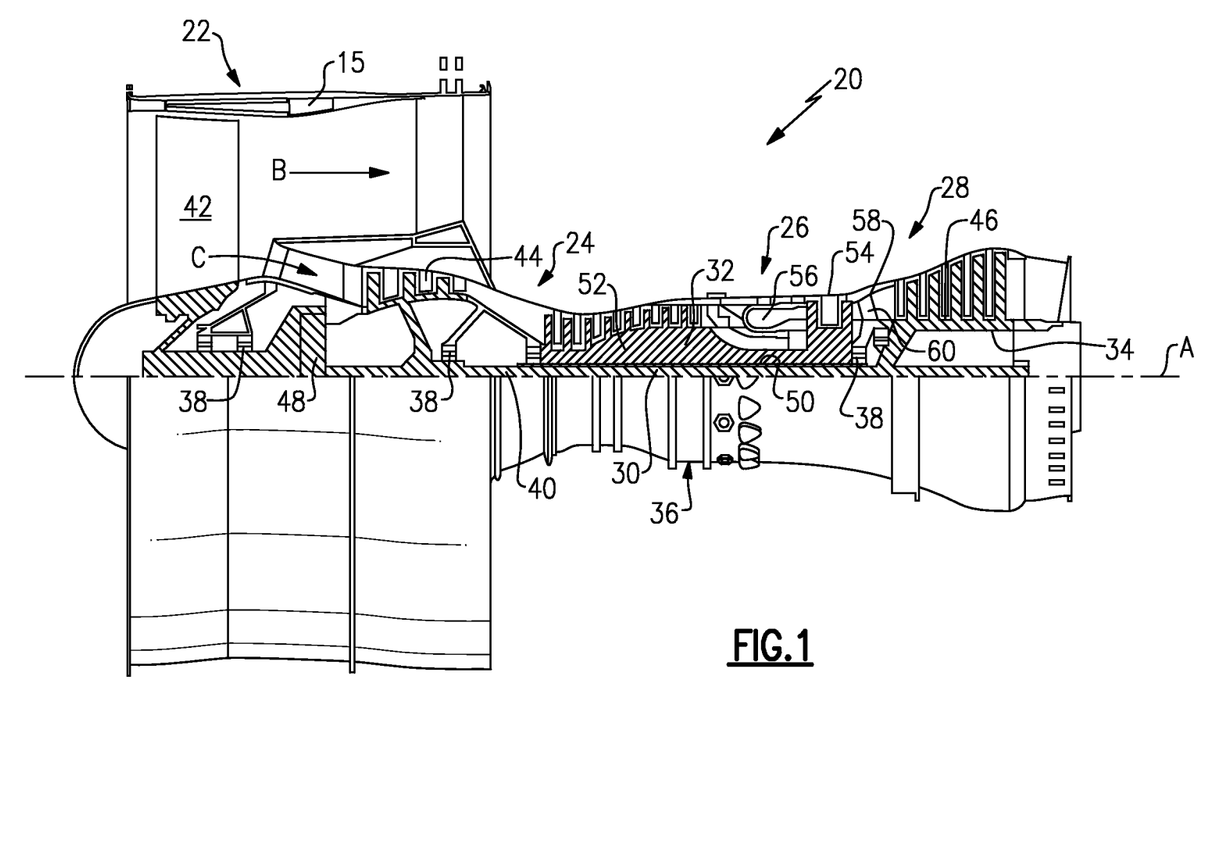
FIG. 1 schematically shows a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a turbofan gas turbine engine in the disclosed non-limiting embodiment, it should be understood that the concepts described herein are not limited to use with turbofans as the teachings may be applied to other types of turbine engines including three-spool architectures.

The engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that interconnects a fan 42, a low pressure compressor 44 and a low pressure turbine 46. The inner shaft 40 is connected to the fan 42 through a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path. The turbines 46, 54 rotationally drive the respective low speed spool 30 and high speed spool 32 in response to the expansion.

The engine 20 in one example is a high-bypass geared aircraft engine. In a further example, the engine 20 bypass ratio is greater than about six (6), with an example embodiment being greater than ten (10), the geared architecture 48 is an epicyclic gear train, such as a planetary gear system or other gear system, with a gear reduction ratio of greater than about 2.3 and the low pressure turbine 46 has a pressure ratio that is greater than about five (5). In one disclosed embodiment, the engine 20 bypass ratio is greater than about ten (10:1), the fan diameter is significantly larger than that of the low pressure compressor 44, and the low pressure turbine 46 has a pressure ratio that is greater than about five (5:1). Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of 1 bm of fuel being burned divided by 1 bf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(\text{Tram }° \text{R})/(518.7° \text{R})]^{0.5}$. The "Low corrected fan tip speed" as disclosed herein according to one non-limiting embodiment is less than about 1150 ft/second.

Figure 2:
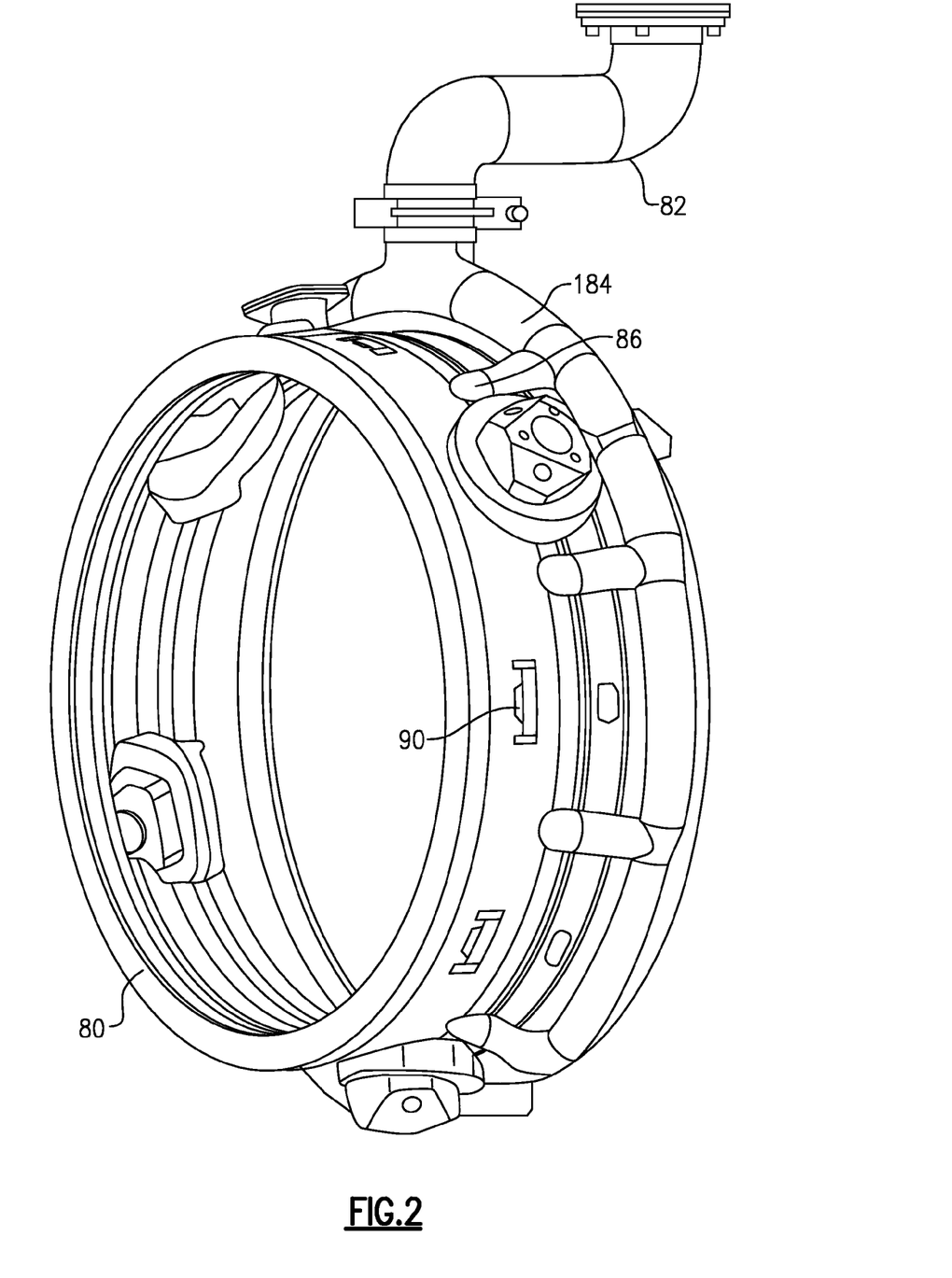
FIG. 2 shows an air recovery manifold.

FIG. 2 shows an air recovery or turbine cooling manifold 80, which may be utilized in the turbine section of the engine 20, as an example.

An outlet s-tube 82 communicates a main recovery duct 184 to a downstream location. A plurality of fingers 86 have inlets (See FIG. 6) which communicate air outwardly of internal channels in the cooling manifold 80 into the main duct 184, such that it may be delivered to the outlet s-tube 82.

Figure 3:
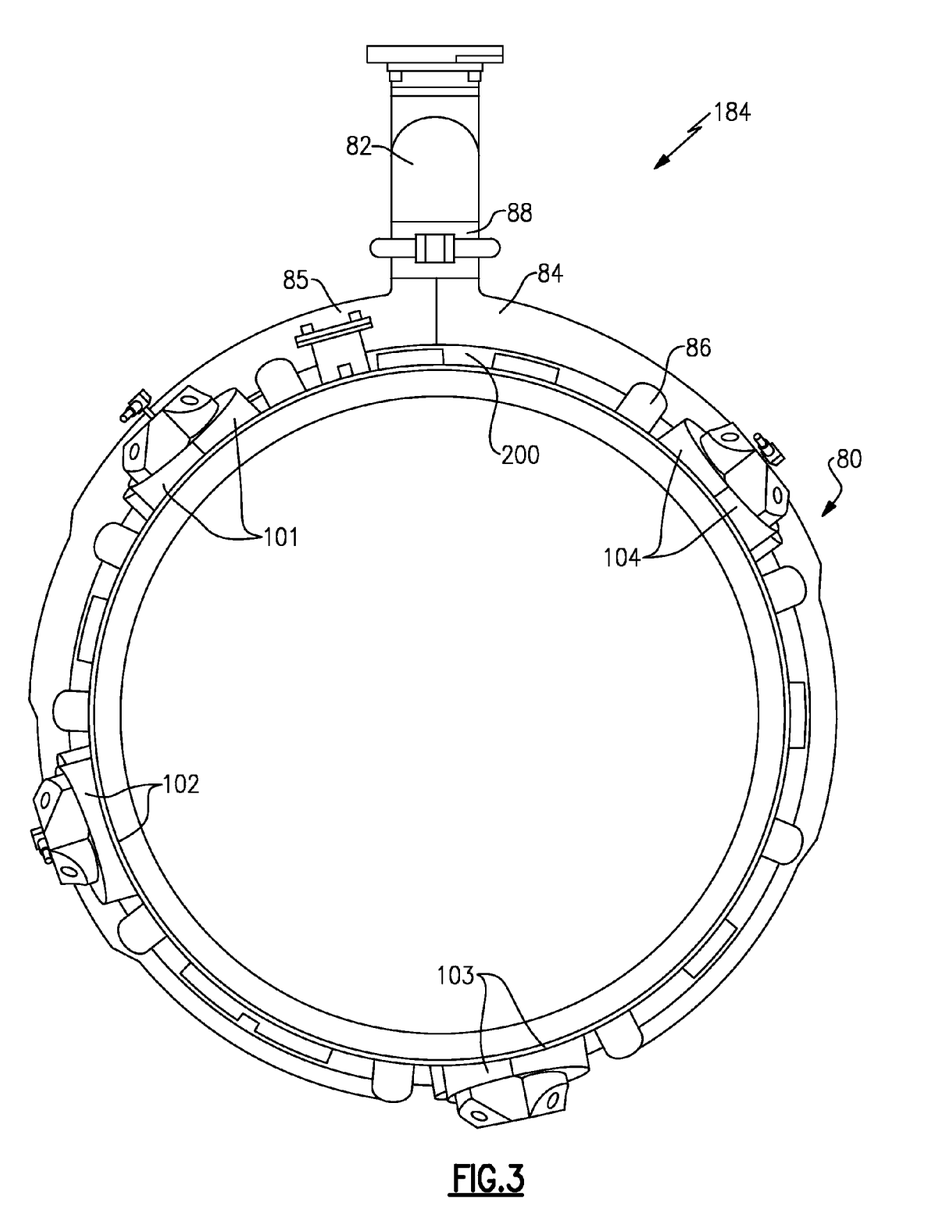
FIG. 3 is a front view of the FIG. 2 air recovery manifold.

As shown in FIG. 3, the main duct 184 has portions 84 and 85 extending in opposed circumferential directions from the outlet tube 82. A clamp 88 secures the outlet tube 82 to the tube portions 84 and 85.

Clamp edges or flanges 100, 101, 102, 103 and 104 connect four separate pieces, as will be explained below. As can be appreciated, the tube portions 84 and 85 are secured directly to a radially outer surface 200 of the cooling manifold 80.

Figure 4A:
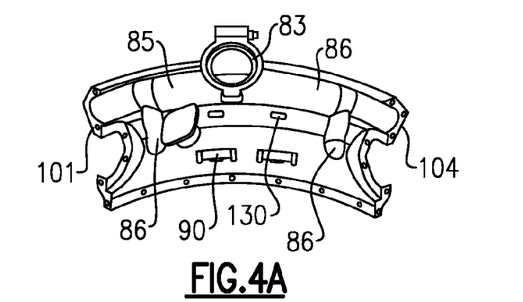
FIG. 4A shows a first component.
Figure 4B:
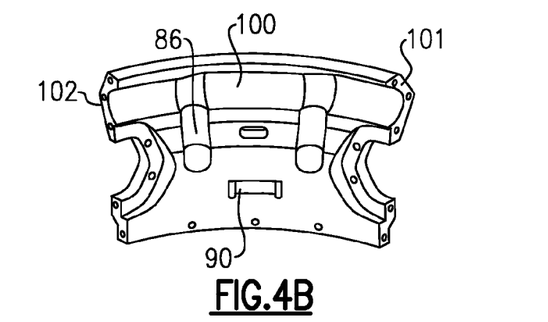
FIG. 4B shows a second component.

FIG. 4A shows a first piece including an input 83 to connect the two portions 85 and 86 to the outlet tube 82. There are connecting flanges 101 and 104 at edges of this first portion. A second flange 101 connects to a connecting flange 101 on a second portion 100 as shown in FIG. 4B. Second portion 100 has fingers 86, and a connecting flange 102 at an opposed circumferential edge.

Figure 4C:
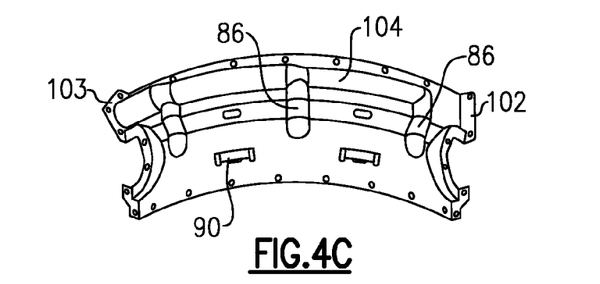
FIG. 4C shows a third component.
Figure 4D:
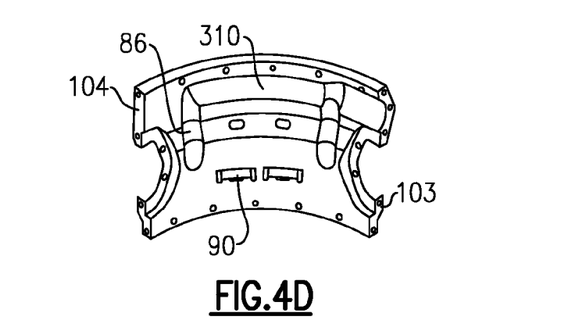
FIG. 4D shows a fourth component.

As shown in FIG. 4C, the connecting flange 102 connects to another portion 104 which extends to a connecting flange 103. As shown in FIG. 4D, the connecting flange 103 connects a piece 310 to the portion 86 through another paired to connection flange 104. The four pieces (85/86, 100, 104 and 310) that make up the main recovery duct 184 all include duct flow positions communicating with fingers 86.

Inlets 90 capture cooling air to be delivered into the interior of the turbine cooling manifold 80. As can be appreciated, the four pieces shown in FIGS. 4A-4D are assembled together, and the outlet s-tube 82 is attached to complete the recovery tube 184.

Figure 5:
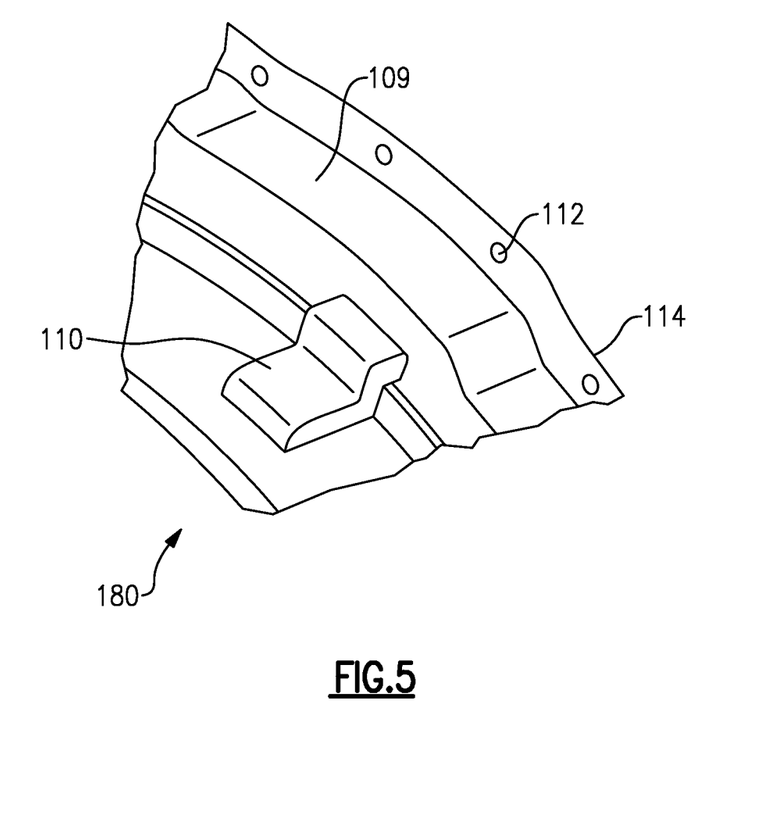
FIG. 5 shows a feature of a second embodiment.

FIG. 5 shows an embodiment wherein a finger 110 is radially lower than a main tube portion 109. The main tube portion 109 is beneath a bolting flange 114 having bolt holes 112. This provides additional room for the bolts to attach the cooling manifold 180 to a connecting housing.

Figure 6:
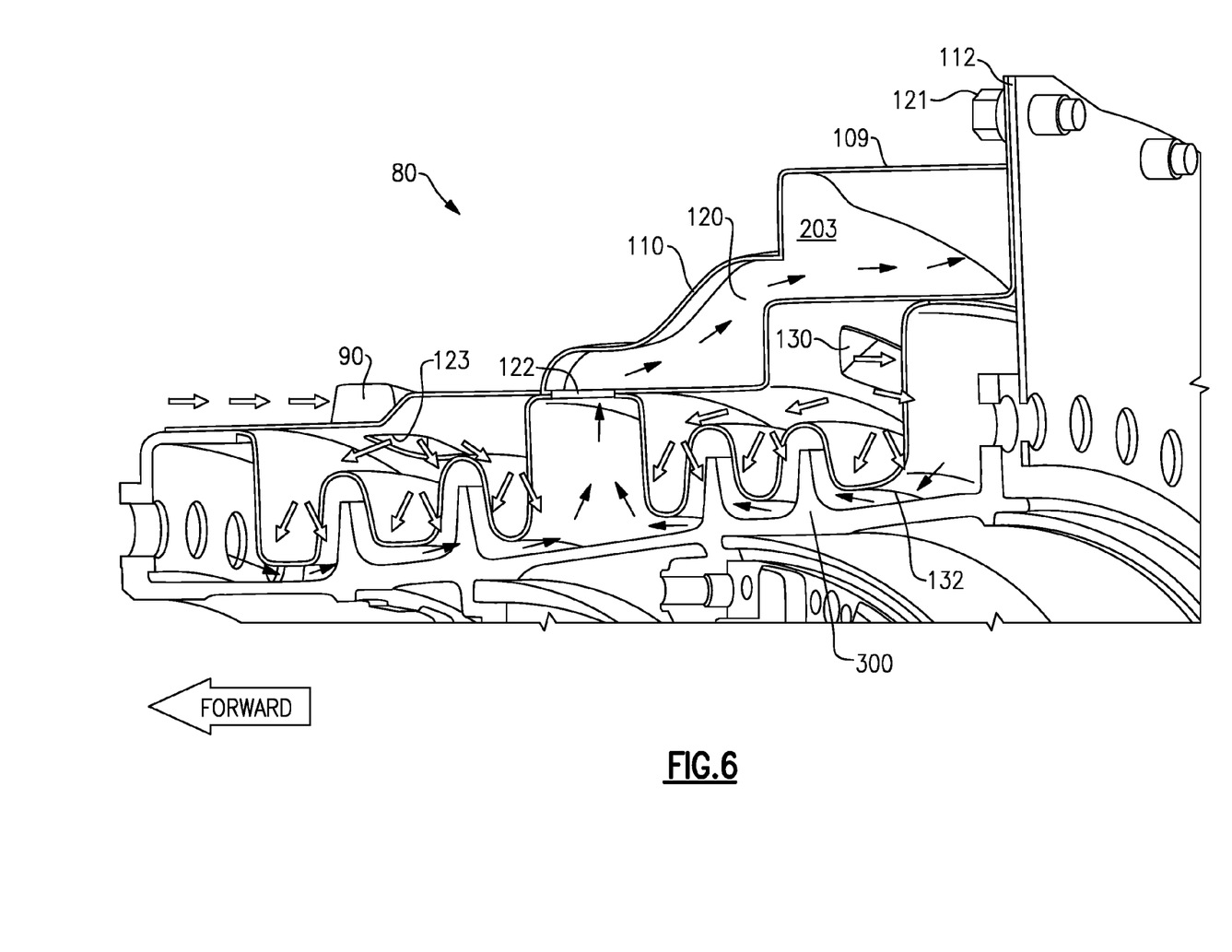
FIG. 6 is a cross-sectional view.

As shown in FIG. 6, the inlets 90 lead to air inlets 123, as do inlets 130 which are positioned intermediate fingers, and can be seen in each of FIGS. 4A-4D. The air entering the inlet 130 passes through a torturous path, and cools internal surfaces of the cooling manifold 80. Similarly, the air entering the inlet 92 also cools the interior of the cooling manifold 80. The air also cools the outer surface of a turbine case 300. Both flows leave out of a plurality of outlets 122 leading into the fingers 110. Notably, the fingers 86 will receive air in the same manner. The air leading through the outlets 122 into the fingers 110 passes into a chamber 120, and eventually all reaches the outlet s-tube 82. As shown, bolt 121 bolts the bolt flange at 114 to an adjacent housing.

As can be seen at 203 in FIG. 6, the flow conduits found in each of the four pieces of FIGS. 4A-4D are connected directly to an outer periphery of the cooling manifold 80.

Air inlets 90 are positioned at an axially forward end, which is actually forward of an axially forward most end of the fingers 86 (or 110), and which deliver air into a forward portion of an interior of the turbine casing 80.

Rear air inlets 130 are circumferentially intermediate fingers 86, and deliver cooling air into a rear portion of the interior of cooling manifold 80. Air enters both the forward and rear inlets for cooling the interior of the cooling manifold 80. Both flows then communicate with air outlets 122 and into a finger 86 (or 110).

Fingers 110 have a radially outermost end which allows access to bolt holes 112 on a plate positioned radially outwardly of the conduit 203.

Although an embodiment of this invention has been disclosed, a worker of ordinary skill in the art would recognize that certain modifications would come within the scope of this invention. For that reason, the following claims should be studied to determine the true scope and content.

The invention claimed is:

1. A turbine cooling manifold comprising:
a plurality of pieces forming a cooling manifold, with each said piece extending in a circumferential direction to abutting flanges, with said abutting flanges being secured together at circumferential ends of each of said plurality of pieces;
cooling channels formed between a radially inner wall and an outer wall of said cooling manifold, and air inlets formed in at least a plurality of said plurality of pieces, said air inlets for delivering air into said cooling channels;
fingers on the outer wall of said cooling manifold, said fingers being aligned within an air outlet, such that air can be delivered into the air inlet, cool an interior of the cooling manifold in said cooling channels, and leave through said air outlet into said fingers, and then extend to a main conduit; and
said main conduit being secured to said outer wall of said cooling manifold.

2. The cooling manifold as set forth in claim 1, wherein one of said plurality of pieces has an outlet connector which is connected to an outlet s-tube.

3. The cooling manifold as set forth in claim 2, wherein said one of said plurality of pieces which receives said outlet connector has main conduit portions extending in both circumferential directions, and having mating flanges at each of two opposed circumferential ends which are attached to others of said plurality of pieces.

4. The cooling manifold as set forth in claim 1, wherein said air inlets include forward air inlets positioned at an axially forward end, which is actually forward of an axially forward most end of said fingers, and which deliver air into a forward portion of said interior of said cooling manifold.

5. The cooling manifold as set forth in claim 4, wherein there are rear air inlets circumferentially intermediate said fingers, and delivering cooling air into a rear portion of said interior of said cooling manifold, and air entering both said forward air inlets and said rear air inlets cooling the interior of the cooling manifold, and then communicating with said air outlet and into said finger.

6. The cooling manifold as set forth in claim 1, wherein said fingers have a radially outermost end which allows access to a bolt hole on a plate positioned radially outwardly of said main conduit.

7. The cooling manifold as set forth in claim 1, wherein said outer wall of said cooling manifold forms a portion of said main conduit and said fingers.

8. A gas turbine engine comprising:
a compressor, a combustor and a turbine section, said turbine section having turbine rotors, and a turbine casing; and
a cooling manifold that cools the turbine casing having a plurality of pieces, with each of said plurality of pieces extending in a circumferential direction to abutting flanges, with said abutting flanges being secured together at circumferential ends of each of said plurality of pieces, cooling channels formed between a radially inner wall and an outer wall of said cooling manifold, and air inlets formed in at least one of said plurality of pieces, the air inlets for delivering air into said cooling channels, fingers on the outer wall of said cooling manifold, said fingers being aligned within an air outlet, such that air can be delivered into the air inlet, cool an interior of the cooling manifold in the cooling channels, and leave through said air outlet into said fingers, and then extend to a main conduit and said main conduit being secured to said outer wall of said cooling manifold.

9. The gas turbine engine as set forth in claim 8, wherein one of said plurality of pieces has an outlet connector which is connected to an outlet s-tube.

10. The gas turbine engine as set forth in claim 9, wherein one of said plurality of said pieces which receives said outlet connector has main conduit portions extending in both circumferential directions, and having mating flanges at each of two opposed circumferential ends which are attached to others of said plurality of pieces.

11. The gas turbine engine as set forth in claim 8, wherein said inlets include forward air inlets positioned at an axially forward end, which is actually forward of an axially forward most end of said fingers, and which deliver air into a forward portion of said interior of said cooling manifold.

12. The gas turbine engine as set forth in claim 11, wherein there are rear air inlets circumferentially intermediate said fingers, and delivering cooling air into a rear portion of said interior of said cooling manifold, and air entering both said forward air inlets and said rear air inlets cooling the interior of the cooling manifold, and then communicating with said air outlet and into said finger.

13. The gas turbine engine as set forth in claim 8, wherein said fingers have a radially outermost end which allows access to a bolt hole on a plate positioned radially outwardly of said main conduit.

14. The gas turbine engine as set forth in claim 8, wherein said outer wall of said cooling manifold forms a portion of said main conduit and said fingers.

\* \* \* \* \*

UNITED STATES PATENT AND TRADEMARK OFFICE
CERTIFICATE OF CORRECTION

PATENT NO. : 10,072,520 B2  
APPLICATION NO. : 14/760746  
DATED : September 11, 2018  
INVENTOR(S) : Pisacreta et al.

Page 1 of 1

It is certified that error appears in the above-identified patent and that said Letters Patent is hereby corrected as shown below:

On the Title Page

Item (54) and in the Specification, Column 1, Line 1, the Title should read as follows:  
COOLING MANIFOLD FOR TURBINE SECTION Signed and Sealed this  
Sixteenth Day of April, 2019

Andrei Iancu  
*Director of the United States Patent and Trademark Office*